April 29, 1969    G. H. ERB ET AL    3,441,189
CONDUIT ROLLER BEARING
Filed July 17, 1967

United States Patent Office 3,441,189
Patented Apr. 29, 1969

3,441,189
CONDUIT ROLLER BEARING
George H. Erb, Cuttingsville, Vt., William E. Horenburger, Nyack, N.Y., Bradley E. Sanguinetti, Northvale, and Edward F. Hayden, Woodcliff Lake, N.J., assignors to General Bearing Company, Inc., West Nyack, N.Y., a corporation of New York
Filed July 17, 1967, Ser. No. 653,726
Int. Cl. B65h 17/22; E21c 29/16
U.S. Cl. 226—189          4 Claims

ABSTRACT OF THE DISCLOSURE

An articulate chain type series of bearings adapted to be disposed within a hollow conduit of curved configuration to facilitate insertion of and pulling through of heavy conduits, by the reduction of rubbing friction on the inner surface of the conduit as the cable is forced to bend to conform to the configuration of the conduit.

---

This invention relates generally to the field of telephone and similar type large diameter conduits which are buried below ground level, and form a protective shield for subterranean telegraph, telephone and electrical cables, and more particularly to an improved bearing construction adapted to be disposed within the conduit to facilitate the insertion of cable therein.

Cables in general use today are made up of many individual conductors, and are difficult to handle from the standpoint of insertion into a conduit, where the conduit itself is of rectilinear configuration. Where the conduit is curved, it is even more difficult to pull the cable through the conduit, owing to the fact that the outer surface of the cable will bear upon the inner surface of the conduit in negotiating the bend, particularly on the inside portion of the curve.

It is therefore among the principal objects of the present invention to provide an improved roller bearing means which may be incorporated into a curved length of conduit prior to assembly of the curve length with other straight lengths to facilitate the entry and passage of the cable through the conduit.

Another object of the invention lies in the provision of an improved combination conduit and bearing structure which may be formed in preassembled fashion for incorporation into a line of linked conduit members for the purpose of facilitating the placing of a length of cable therein.

Yet another object of the invention lies in the provision of an improved structrue of the class described, in which the cost of fabrication may be of a reasonably low order, with consequent wide sale, distribution and use.

A further object of the invention contemplates the provision of roller bearing conduit structure which will not, in any manner, interfere with normal assembly of a line of conduit.

Yet another object of the invention lies in the provision of an improved bearing structure of the class described, which, during use, will not in any way damage or mar the outer surface of the inserted cable.

A feature of the invention lies in the fact that the improved bearing structure referred to hereinabove, when positioned within a curved length of conduit, allows more than adequate room for the insertion of the cable.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
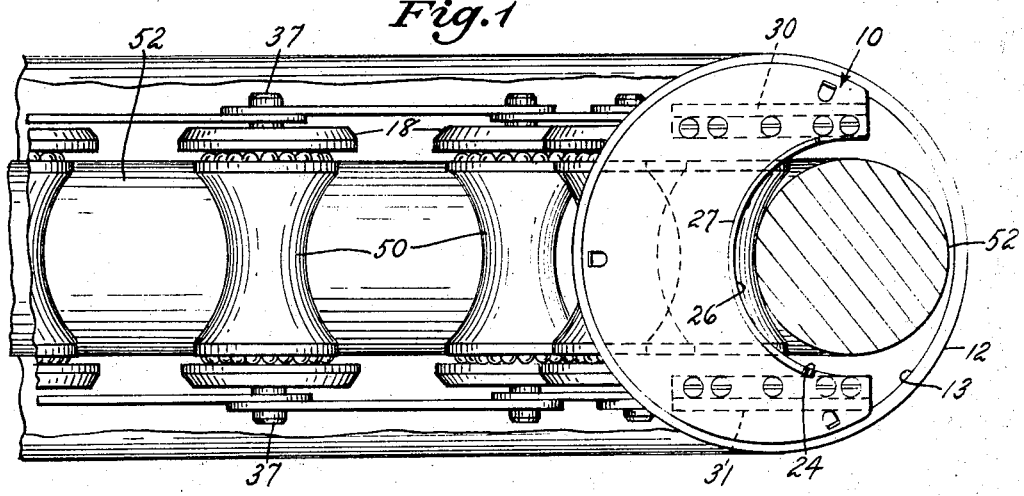
FIGURE 1 is a view in elevation, partly broken away to show detail, and partly in section, of an embodiment of the invention showing a cable positioned within a curved length of conduit.

In accordance with the invention, the device, generally indicated by reference character 10, includes a conventional curved length of conduit 11, normally formed from synthetic resinous or masonry substances. The conduit 11 is bounded by an outer surface 12, an inner surface 13, as well as end edge surfaces 14 and 15.

Disposed within the opening formed by the surfaces 14 and 15 are first and second end elements, 16 and 17, respectively, which are interconnected to a plurality of bearing elements 18 by link elements 19.

The end elements 16 and 17, are substantially similar, and accordingly, a description of one of said elements will serve equally well to describe the other. The element 16 includes an end plate member 20 bounded by outer curved peripheral edge surface 21, an outwardly disposed surface 22, an inwardly disposed surface 23, and an inner curved peripheral edge surface 24. Interconnected to the outwardly disposed surface 22 is a scoop-shaped guide 25, including an inner surface 26, an outer surface 27, said surfaces meeting in a rounded peripheral edge 28.

Mounted on the inwardly disposed surface 23 is a terminal mounting member 29 attached by brackets 30 and 31 (see FIGURE 1), and provided with aligned openings, one of which is indicated by reference character 32 which mount a pintle 33, interconnecting the terminal link element 19.

Figure 2:
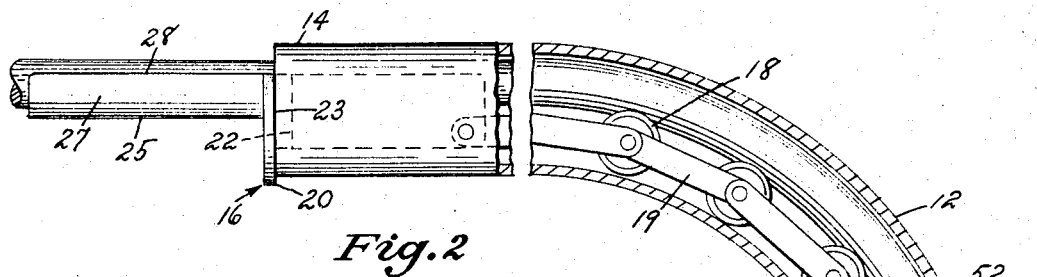
FIGURE 2 is a longitudinal central sectional view thereof, partly in elevation.

As may be seen from a comparison of both ends in FIGURE 2, the end plate member 20 of the first end element 16 is slightly smaller than the overall diameter of the conduit, whereas that of the element 17 is slightly greater to facilitate engagement of the conduit 11 with other similarly shaped conduit members (not shown).

Figure 3:
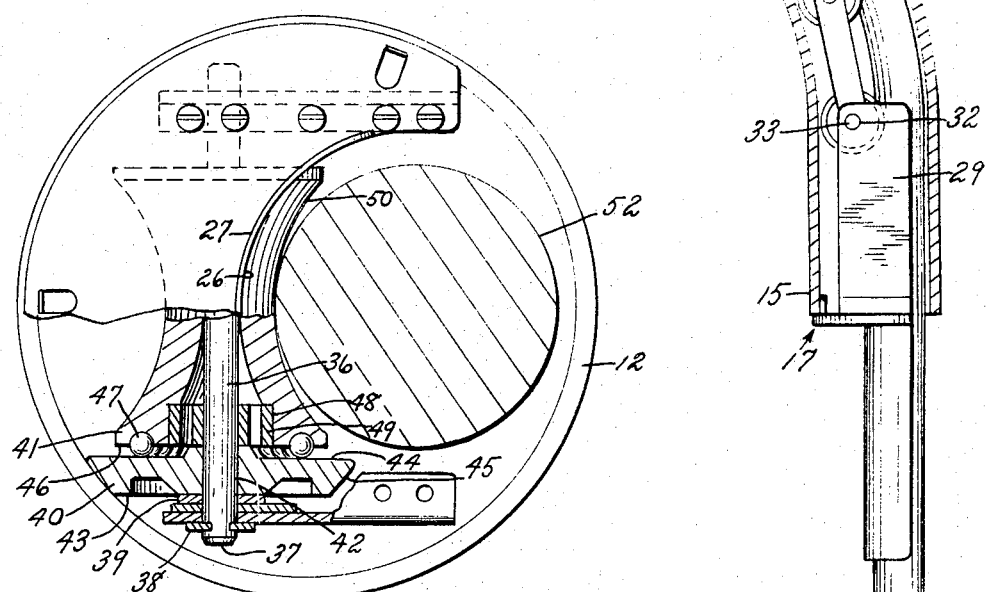
FIGURE 3 is an enlarged view in elevation, partly in section, and partly broken away to show detail, corresponding to the right hand portion of FIGURE 1.

The bearing elements 18 are best understood from a consideration of FIGURE 3 in the drawing, each being mounted on an axially disposed pintle 36, the ends 37 of which are provided with retaining members 38 which maintain them in engaged relation with the link elements 19. An anti-friction washer 39 bears against a first roller member 40, there being one at each end of the pintle 36, which are maintained in relatively friction free relation with a centrally disposed roller member 41. The roller members 41 include a central bore 42, and are bounded by an outwardly disposed surface 43, and an inwardly disposed surface 44, an angularly disposed peripheral surface 45 adapted to rest upon the inner surface 13 of the conduit 11.

The central roller member 41 includes end surfaces 46 which are isolated from the roller members 40 by ball bearings 47, and are provided at each end with recesses, one of which is indicated by reference character 48 for the accommodation of roller or ball bearing cages 49 to permit the same to turn with relatively little friction on the pintle 36. It will be observed that by virtue of the greater diameter of the members 40 with respect to that of the member 41, when the bearing elements 18 are disposed within the conduit, the second roller member 41 is completely free of contact therewith. The axially disposed surface 50 is preferably in the form of a surface of revolution, of diameter somewhat greater than that of the cable 52, so as to obtain a theoretical line contact when the cable is inserted.

The conduit 11 is assembled in normal manner with other conduit members (not shown), the elements 16–19 having been previously interconnected within the conduit prior to such assembly. Once installed, the cable 52 is threaded through the assembled conduit sections, using a combination of pushing and drawing forces. Upon entering the conduit 11, the cable is forced to deform in order to conform therewith, and subsequent movement is facilitated by the engagement of the cable 52 with the surface 50 upon which it rolls.

It will be understood by those skilled in the art, that the bending of the cable is not limited to any given plane, since other conduit sections similar to that indicated by reference character 11 may be interconnected in skew relation therewith.

We wish it to be understood that we do not consider the invention limited to the precise details of structure shown and set forth in this specification, for obvious modifications will occur to those skilled in the art to which the invention pertains.

We claim:

1. As a new article of manufacture, a conduit roller bearing device comprising: first and second end elements each having provision for engaging the open ends of a length of hollow conduit, a plurality of roller elements, and link means interconnecting said roller elements in articulated relation to said end elements.

2. Structure in accordance with claim 1, each of said link elements including a centrally positioned roller member, and means for maintaining said roller member in spaced relation with respect to the inner surface of a conduit.

3. Structure in accordance with claim 2, said roller member having thrust bearing means for reducing friction between said roller member and said last mentioned means.

4. Structure in accordance with claim 1 in combination with a section of curved conduit of substantially equivalent length.

References Cited

UNITED STATES PATENTS

| | | | |
|---|---|---|---|
| 2,926,001 | 2/1960 | Mack | 254—190 |
| 3,370,642 | 2/1968 | Meier | 226—189 |

M. HENSON WOOD, JR., *Primary Examiner.*

RICHARD A. SCHACHER, *Assistant Examiner.*

U.S. Cl. X.R.

254—134.3